United States Patent [19]

Nagai et al.

[11] Patent Number: 5,291,483
[45] Date of Patent: Mar. 1, 1994

[54] CELL TRANSFER METHOD AND CELL RECEIVING APPARATUS

[75] Inventors: Tetsuya Nagai, Yokohama; Katsuyuki Yamazaki, Tsurugashima, both of Japan

[73] Assignees: Matsushita Electric Industrial Co., Ltd., Osaka; Kokusai Denshin Denwa Co., Ltd., Tokyo, both of Japan

[21] Appl. No.: 84,956

[22] Filed: Jul. 2, 1993

[30] Foreign Application Priority Data

Jul. 10, 1992 [JP] Japan ................... 4-183984

[51] Int. Cl.⁵ .............................. H04J 3/26
[52] U.S. Cl. ............................ 370/60; 370/94.1
[58] Field of Search ............... 370/60, 60.1, 94.1, 370/94.2, 105.4, 119

[56] References Cited

U.S. PATENT DOCUMENTS 4,319,336 3/1982 Anderson et al. ............. 364/200 X
5,195,091 3/1993 Farwell et al. ................ 370/94.1

*Primary Examiner*—Douglas W. Olms
*Assistant Examiner*—Melvin Marcelo
*Attorney, Agent, or Firm*—Stevens, Davis, Miller & Mosher

[57] ABSTRACT

A cell transfer method and a cell receiving apparatus in which cells of an asynchronous transfer mode are used to transfer information for a plurality of channels regardless of the number of channels and without reduction of the utilization rate of cell in the same cell configuration and the information for the channels can be reproduced while maintaining synchronization between the channels in a receiving side. The cell has an identifier for each channel and is exclusively used for each channel. Cells to be reproduced at the same time are given the same sequence number to be transferred. On the receiving side, when a cell is inputted in a cell disassembling circuit, the cell is disassembled into a sequence number, a channel identifier and channel data and channel information is written or stored in a buffer together with the sequence number by a distributing circuit in accordance with contents of the channel identifier. Reading of data from the buffers is made simultaneously from the buffers with respect to the data having the number indicated by a sequence number counter.

2 Claims, 4 Drawing Sheets

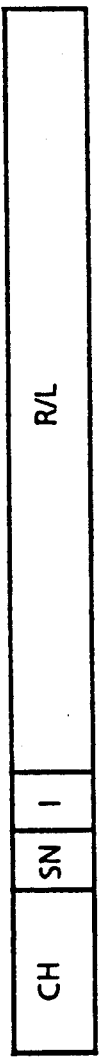

CELL TRANSFER METHOD AND CELL RECEIVING APPARATUS

BACKGROUND OF THE INVENTION

The present invention relates to a cell transfer method and a cell receiving apparatus for use in communication or the like of an asynchronous transfer mode.

FIG. 1 is a schematic diagram illustrating a cell receiving apparatus using a conventional cell transfer method and FIG. 2 illustrates a format of a cell used in the conventional cell transfer method. In this description of a prior art, a case where voice data as information is transferred in a stereophonic mode is described by way of example. In FIG. 2, CH represents a cell header, SN a sequence number, and R and L voice data for R and L channels, respectively. Voice data is a sample of 125 μs and one sample is one octet. One cell includes 20 samples for each of R and L channels and can carry data for 2.5 ms. Transmission of a cell is made every 2.5 ms. In FIG. 1, numeral 1 denotes a cell disassembling circuit which disassembles an input cell into a sequence number, R-channel data, and L-channel data. Numerals 2 and 3 denote an R-channel buffer and an L-channel buffer, respectively, which store data for corresponding channels together with the sequence number. Numerals 4 and 5 denote reading control circuits for R and L channels, respectively. They supply reading signals to the buffers 2 and 3 when data of the number indicated by a sequence number counter 6 are stored in the buffers 2 and 3. Numeral 7 denotes a sequence number counter control circuit which increments the sequence number counter every 2.5 ms during which voice data for one cell is produced.

Operation of the above prior art is now described. In FIG. 1, when a cell is inputted, the cell disassembling circuit 1 disassembles the inputted cell into the sequence number, the R-channel data and the L-channel data. Data for the respective channels are stored in the R-channel buffer 2 and the L-channel buffer 3 together with the sequence number. On the other hand, on the reading side of the buffers 2 and 3, the R-channel reading control circuit 4 or the L-channel reading control circuit 5 produces a reading signal to data having the sequence number indicated by the sequence number counter 6, so that an R data is outputted from the R-channel buffer 2 or an L data is outputted from the L-channel buffer 3. Since the sequence number counter 6 is incremented every 2.5 ms by the sequence number counter control circuit 7, data for each channel is outputted successively. The reading control circuits 4 and 5 operate to read only data having the number indicated by the sequence number counter 6 and accordingly even when a cell having the sequence number of 3 is missing in a network as shown in FIG. 3, for example, any data is not produced when the counter 6 indicates the number 3 and hence data of a cell having a different sequence number is not reproduced in error.

As described above, even in the conventional cell transfer method, voices for a plurality of channels can be synchronized to be transferred and reproduced.

In the conventional cell transfer method, however, since data for all channels are contained in one cell, there is a problem that it is limited to cope with multiple channels. More particularly, if it is assumed that an area for voice data of the cell is 40 octets and one voice sample is expressed by one octet, for example, only 40 channels can be transferred at maximum.

Further, there is a problem that the format of the cell must be changed in accordance with the number of channels to be handled. For example, the cell format for two-channel voice can not cope with three channels or more as it is. Moreover, the utilization rate of cell is reduced to about a half if voice for only one channel is to be transferred.

SUMMARY OF THE INVENTION

It is an object of the present invention to solve the problems in the prior art and to provide an excellent cell transfer method and cell receiving apparatus which can cope with multiple channels easily and in which the utilization rate of cell is not reduced.

In order to achieve the object, the cell transfer method according to the present invention comprises the steps of: providing a channel identifier in a cell to assign the cell to each channel exclusively; giving the same sequence number to cells having channel information to be reproduced at the same timing to transfer the cells; and causing a cell receiving side to identify the channel in accordance with the channel identifier, store the received channel information for each channel and utilize a waiting time from reception to reproduction of the cell so that the channel information of the cells having the same sequence number is reproduced at the same time.

The cell receiving apparatus according to the present invention comprises cell disassembling means for disassembling an inputted cell into a sequence number, a channel identifier and channel information, distribution means for distributing the channel information of the cell to each channel in accordance with the channel identifier of the disassembled cell, storing means for storing the distributed channel information together with the sequence number for each channel, reading control means for reading the channel information from the storing means on the basis of the sequence number, counter means for indicating the sequence number for reading to the reading control means, and counter control means for allowing the counter means to supply a sequence number to the reading control means after a time point at which it is estimated that the cell disassembling means would have received one set of cells which have a same sequence number on the basis of the signal from the cell disassembling means.

According to the present invention, the channel information of the cells having the same sequence number can be reproduced at the same time to thereby attain synchronism between channels. Further, since reproduction is controlled by the sequence number counter, it is possible to cope with a loss of cell in a network in the same manner as in the prior art.

BRIEF DESCRIPTION OF THE DRAWINGS

FIG. 5 illustrates a format of a cell in the embodiment of the present invention; and FIG. 6 is a schematic diagram illustrating an example of a voice data reproduction timing in the embodiment of the present invention.

DESCRIPTION OF THE PREFERRED EMBODIMENTS

Figure 1:
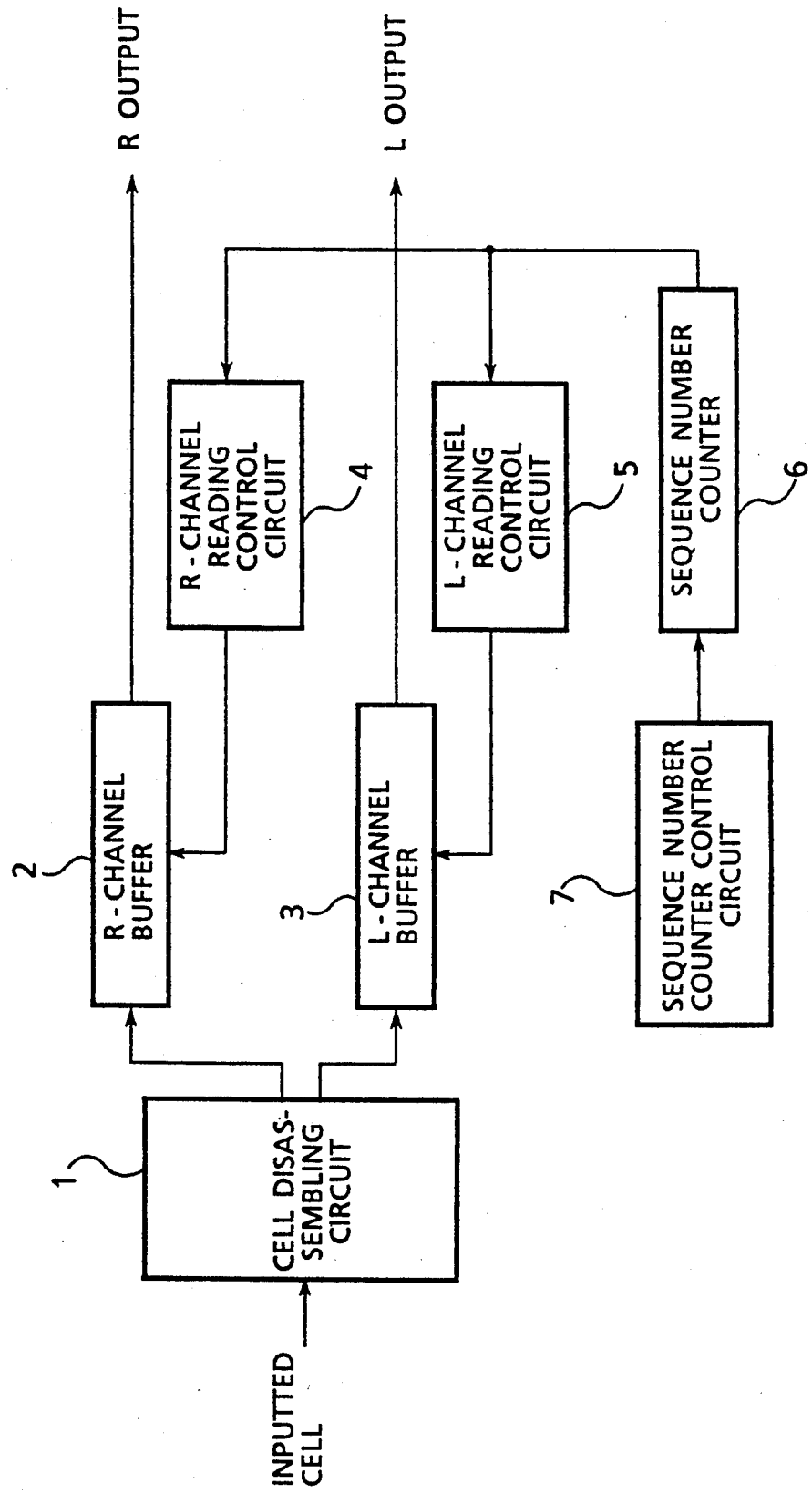
FIG. 1 is a block diagram schematically illustrating a cell receiving apparatus using a conventional cell transfer method.
Figures 2, 3:
FIG. 2 illustrates a format of a cell in the conventional cell transfer method.
FIG. 3 is a schematic diagram illustrating an example of a voice data reproduction timing in the conventional cell transfer method.
Figure 4:
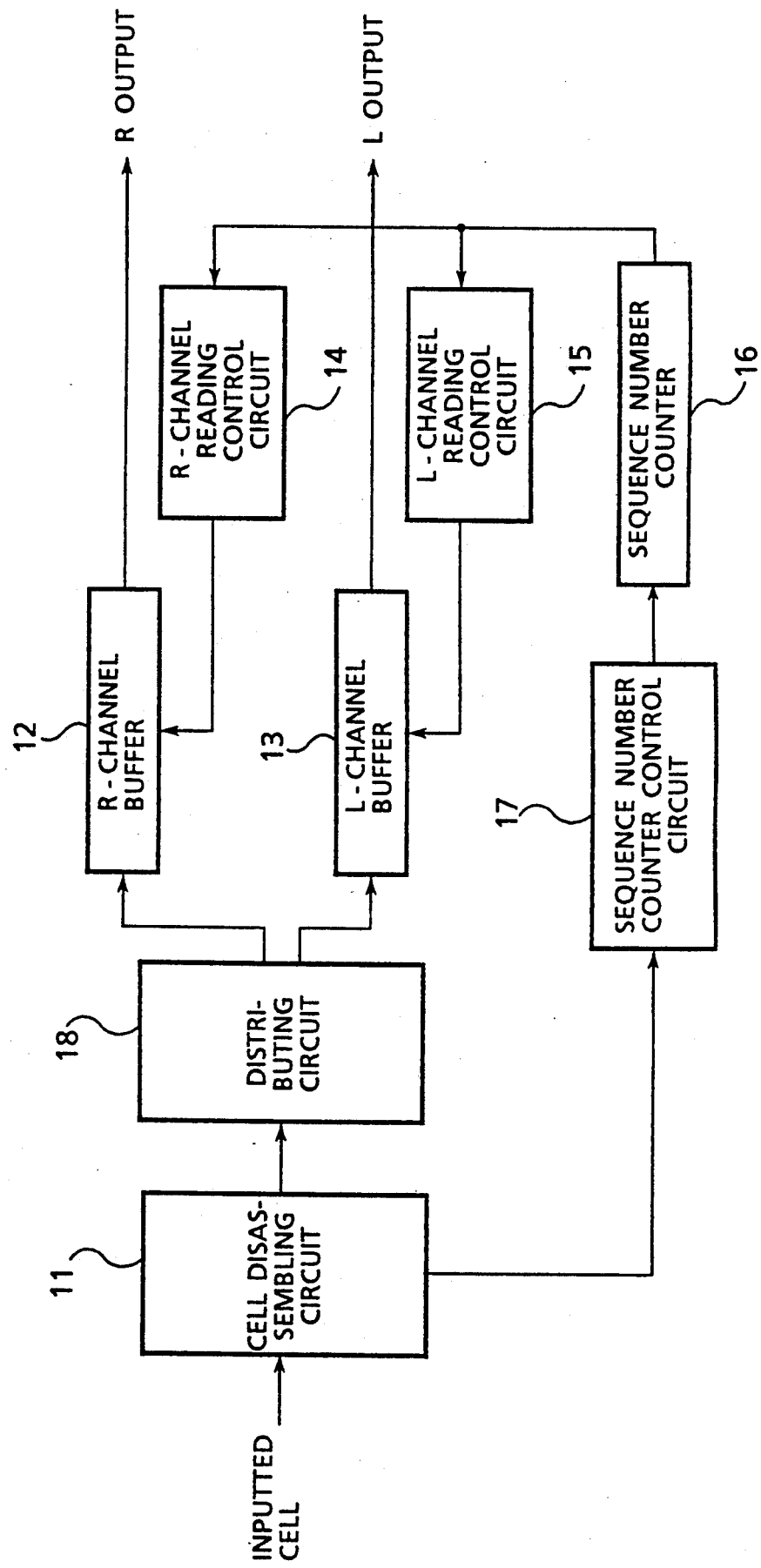
FIG. 4 is a block diagram schematically illustrating a cell receiving apparatus according to an embodiment of the present invention.

FIG. 4 is a schematic diagram illustrating a cell receiving apparatus using a cell transfer method according to the present invention. The embodiment illustrates an example of two channels for R and L. FIG. 5 illustrates a format of a cell used in the cell transfer method according to the present invention. In FIG. 5, CH represents a cell header, SN a sequence number, I a channel identifier, R and L voice data for R and L channels, respectively. The SN's of the cells to be reproduced at the same time have the same value for both channels. Voice data is a sample of 125 μs and one sample is one octet. One cell includes 40 samples as data for R or L channel and can carry data for 5 ms. Transmission of a cell is made successively in order of R and L every 5 ms.

In FIG. 4, numeral 11 denotes a cell disassembling circuit which disassembles an inputted cell into a sequence number, a channel identifier and R- or L-channel data. Numeral 18 denotes a distributing circuit which supplies the data of the inputted cell to an R-channel buffer 12 or an L-channel buffer 13 in accordance with the channel identifier of the inputted cell. The R-channel buffer 12 and the L-channel buffer 13 store the channel data together with the sequence number. Numerals 14 and 15 denote R- and L-channel reading control circuits, respectively, each of which supplies a reading signal to the buffer 12 or 13 when data having a number indicated by a sequence number counter 16 is stored in the buffer 12 or 13. Numeral 17 denotes a sequence number counter control circuit which operates the sequence number counter 16 after waiting until an input cell for L channel is to be stored in the L-channel buffer 13 completely when the control circuit 17 is informed by the cell disassembling circuit 11 that a first R-channel cell has been inputted after start and thereafter increments the sequence number counter 16 every 5 ms.

Operation of the embodiment is now described. When a cell is inputted in the receiving apparatus shown in FIG. 4, the cell is disassembled into a sequence number, a channel identifier and R- or L-channel data by the cell disassembling circuit 11. The channel data is written or stored in the R-channel buffer 12 or L-channel buffer 13 together with the sequence number by the distributing circuit 18 on the basis of the disassembled channel identifier. On the other hand, on the reading side of the buffers 12 and 13, the R- and L-channel reading control circuit 14 or 15 produces a reading signal to data having a number indicated by the sequence number counter 16, so that R-channel buffer 12 produces R data or the L-channel buffer 13 produces L data. Since the sequence number counter 16 is incremented by the sequence number counter control circuit 17 every 5 ms during which all of R-channel data and L-channel data of the inputted cell have been stored in the buffers 12 and 13, respectively, data for each channel having the same sequence number is successively produced at the same time. Further, the reading control circuits 14 and 15 operate to read only data having the number indicated by the sequence number counter 16 and accordingly even if a cell having the sequence number of 2 for R channel is missing in a network as shown in FIG. 6, for example, any data is not produced when the counter 16 indicates the number 2 and it is prevented that data for cell having a different sequence number is reproduced in error.

As described above, according to the embodiment, data of cells having the same sequence number are reproduced at the same time, so that voice data for both channels can be synchronized. Further, since each of channels is independent, multiple channels can be easily used and even if voice data for only one channel is transferred, the utilization rate of cell is large.

In the embodiment, voice data is used as the channel information by way of example, while data of other kinds such as image data may be used if it requires synchronization between channels on the side of reproduction.

We claim:

1. A cell transfer method comprising the steps of: providing a channel identifier in a cell to assign the cell to each channel exclusively; giving the same sequence number to cells having channel information to be reproduced at the same timing to transfer the cells; and causing a cell receiving side to identify the channel in accordance with the channel identifier, store the received channel information for each channel and utilize a waiting time from reception to reproduction of the cell so that the channel information of the cells having the same sequence number is reproduced at the same time.

2. A cell receiving apparatus comprising: cell disassembling means for disassembling an inputted cell into a sequence number, a channel identifier and channel information; distribution means for distributing the channel information of the cell to each channel in accordance with the channel identifier of the disassembled cell; storing means for storing the distributed channel information together with the sequence number for each channel; reading control means for reading the channel information from said storing means on the basis of the sequence number; counter means for indicating the sequence number for reading to said reading control means; and counter control means for allowing said counter means to supply a sequence number to said reading control means after a time point at which it is estimated that the cell disassembling means would have received one set of cells which have a same sequence number on the basis of the signal from said cell disassembling means.

* * * * *